United States Patent
Kodaira et al.

(10) Patent No.: US 8,747,984 B2
(45) Date of Patent: Jun. 10, 2014

(54) OPTICAL RECORDING MEDIUM

(71) Applicant: Taiyo Yuden Co., Ltd., Tokyo (JP)

(72) Inventors: Takuo Kodaira, Takasaki (JP);
Kazunobu Takeguchi, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 13/748,404

(22) Filed: Jan. 23, 2013

(65) Prior Publication Data

US 2013/0189545 A1    Jul. 25, 2013

(30) Foreign Application Priority Data

Jan. 24, 2012  (JP) .................................. 2012-012361

(51) Int. Cl.
*G11B 7/24*    (2013.01)

(52) U.S. Cl.
USPC ... 428/64.1; 428/64.4; 428/64.8; 430/270.14; 430/270.16

(58) Field of Classification Search
USPC .................................... 428/64.8; 430/270.16
See application file for complete search history.

(56) References Cited

U.S. PATENT DOCUMENTS

| | | | |
|---|---|---|---|
| 2008/0081285 A1* | 4/2008 | Watanabe et al. | 430/270.16 |
| 2009/0252013 A1 | 10/2009 | Nakamura et al. | |
| 2010/0002569 A1* | 1/2010 | Nagase et al. | 369/275.4 |
| 2011/0129635 A1 | 6/2011 | Kodaira et al. | |
| 2011/0202942 A1* | 8/2011 | Fujimoto et al. | 720/718 |
| 2011/0244164 A1 | 10/2011 | Somei et al. | |

FOREIGN PATENT DOCUMENTS

| | | |
|---|---|---|
| EP | 1903561 A1 | 3/2008 |
| EP | 1967378 A1 | 9/2008 |
| JP | 2007-045147 A | 2/2007 |
| JP | 2007-196661 A | 8/2007 |
| JP | 2010-033639 A | 2/2010 |
| JP | 2010-143184 A | 7/2010 |
| TW | 200817326 A | 4/2008 |

* cited by examiner

*Primary Examiner* — Elizabeth Mulvaney
(74) *Attorney, Agent, or Firm* — Law Office of Katsuhiro Arai

(57) ABSTRACT

An object of the present invention is to provide a recordable optical recording medium whose characteristics do not deteriorate when recording is conducted in a high-temperature environment. The present invention provides a recordable optical recording medium comprising a substrate as well as at least a reflection layer, recording layer and light transmission layer provided on the substrate, wherein the recording layer of said optical recording medium contains (a) an azo metal complex dye and (b) ionic organic compound containing a heteroaromatic quaternary ammonium ion.

12 Claims, 1 Drawing Sheet

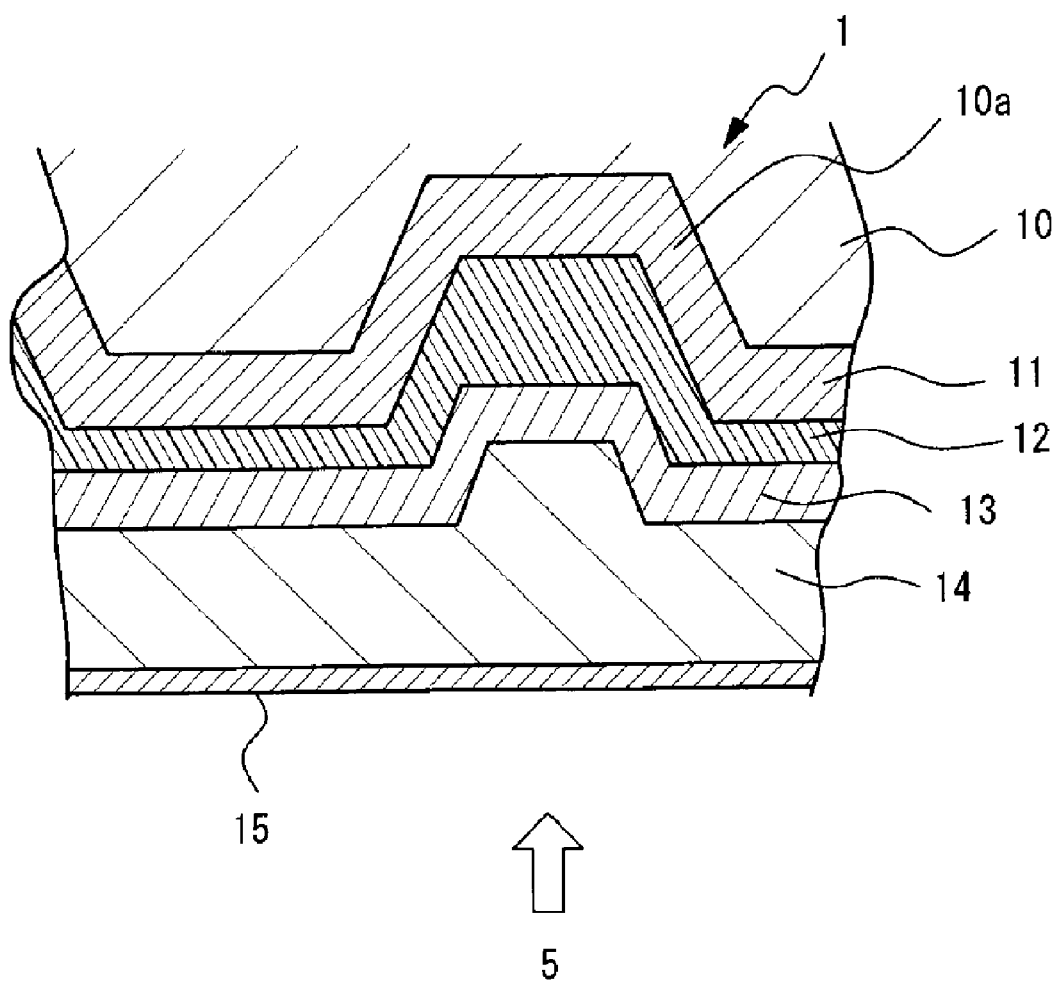

OPTICAL RECORDING MEDIUM

BACKGROUND

1. Field of the Invention

The present invention relates to a recordable optical recording medium of LTH (Low to High) recording type, having a recording layer that contains organic dye and capable of recording and playing back data using light of 300 nm to 500 nm in wavelength. To be specific, the present invention relates to a recordable optical recording medium of LTH (Low to High) recording type, having a recording layer that contains organic dye and capable of recording and playing back data using light of 300 nm to 500 nm in wavelength, wherein said recordable optical recording medium permits a light transmission layer of one-layer configuration and whose characteristics do not deteriorate when stored in a high-temperature, high-humidity environment.

2. Description of the Related Art

Conventional LTH-type BD-R discs with a recording layer that uses organic dye material have a cover layer of two-layer structure (the number of layers excludes a hardcoat layer). One of these layers is a cover layer made of hard material to resist scratching, as with HTL-type BD-R discs whose recording layer uses inorganic material; while the other layer is a cover layer that uses soft (low in elastic modulus (20 MPa or less)) material (acrylic resin or pressure-sensitive adhesive) for the purpose of accepting deformation caused by heat generation and expansion of dye when recording is conducted, maintaining a deformed state, and ensuring sufficient characteristics with Δnd. To realize low-cost organic BD-Rs, however, it is desirable to have a cover layer of one-layer configuration made of hard material, as with inorganic BD-Rs. An azo metal complex having a specific molecular structure is proposed as an organic dye material for recordable optical recording media having such cover layer of one-layer configuration (Japanese Patent Laid-open No. 2010-33639 and Japanese Patent Laid-open No. 2010-143184). One feature of this dye is that it is subject to less deformation when recording is conducted and consequently achieves a cover layer of one-layer configuration. However, discs which use this dye as a recording layer material and whose reflection layer is made with silver or silver alloy present problems in that their recording characteristics deteriorate as the dye in the recording layer reacts with silver in the reflection layer when exposed to a high-temperature, high-humidity environment, thereby causing the dye to change its properties.

PRIOR ART LITERATURES

Patent Literatures

[Patent Literature 1] Japanese Patent Laid-open No. 2010-33639

[Patent Literature 1] Japanese Patent Laid-open No. 2010-143184

SUMMARY

An object of the present invention is to provide a recordable optical recording medium whose characteristics do not deteriorate when stored in a high-temperature, high-humidity environment.

The initial stage of the aforementioned reaction involves corrosion of the reflection layer, or specifically ionization (oxidization) of silver. As long as this ionization of silver is suppressed, the dye will not react with silver and the aforementioned azo metal complex dye having a specific molecular structure will not change its properties. The inventors of the present invention found that, by adding to the recording layer an ionic organic compound containing a heteroaromatic quaternary ammonium ion, such reaction could be suppressed.

In other words, the present invention provides a recordable optical recording medium comprising a substrate as well as at least a reflection layer, recording layer and light transmission layer provided on the substrate, wherein the recording layer of said optical recording medium contains (a) an azo metal complex dye and (b) an ionic organic compound containing a heteroaromatic quaternary ammonium ion. In some embodiments, a dye comprises, consists essentially of, or consists of dye (a) and ionic organic compound (b), wherein dye (a) is a major component, and ionic organic compound (b) is a second major component. In some embodiments, ionic organic compound (b) further contains an anion with which the heteroaromatic quaternary ammonium ion (cation) of ionic organic compound (b) is associated. In some embodiments, dye (a) has no heteroaromatic quaternary ammonium ion. In some embodiments, ionic organic compound (b) is a nitrogen-containing compound. In some embodiments, the anion is constituted by an azo compound or halogen compound. Dye (a) may be constituted by one or more dyes, and ionic organic compound (b) also may be constituted by one or more ionic organic compounds.

According to the present invention, a recordable optical recording medium can be provided that ensures good characteristics, because the characteristics do not deteriorate much when measured after a high-temperature, high-humidity test.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawing of a preferred embodiment which is intended to illustrate and not to limit the invention. The drawing is greatly simplified for illustrative purposes and is not necessarily to scale.

FIG. 1 is a schematic longitudinal cross-section view of a recordable optical recording medium pertaining to a favorable embodiment of the present invention.

DETAILED DESCRIPTION OF EMBODIMENTS

The recordable optical recording medium proposed by the present invention comprises a substrate as well as at least a reflection layer, recording layer, and light transmission layer provided on the substrate, wherein the recording layer contains (a) an azo metal complex dye and (b) ionic organic compound containing a heteroaromatic quaternary ammonium ion.

The substrate functions as a support that ensures the mechanical strength required of an optical recording medium, being a disc of approx. 1.1 mm in thickness and 120 mm in diameter. The material with which to form the substrate is not limited in any way, as long as the mechanical strength required of an optical recording medium can be ensured, and examples include aluminum and other metals, glass, ceramics, and resins, among others. Among those, resins, especially thermoplastic resins, can be used favorably from the viewpoints of moldability, moisture resistance, dimensional stability, cost, etc. Examples of resins which form substrates include, among others, polycarbonate resins; polymethyl methacrylate and other acrylic resins; polyvinyl chloride, vinyl chloride copolymers, and other vinyl chloride resins; epoxy resins; amorphous polyolefin resins; and polyester resins. Among these, polycarbonate resins are particularly preferred.

The reflection layer functions to reflect toward the recording layer the laser beam that has been irradiated onto the optical recording medium and transmitted through the recording layer, and is normally formed with Ag alloy, Al alloy, or other metal of high reflectance. Examples of Ag alloy include AgPdCu, AgCuIn and AgBiNd, etc. Examples of Al alloy include AlNdTa, AlTi, etc. Preferably the reflection layer is formed with Ag alloy.

The recording layer is formed with organic substance that contains organic dye. Preferably the (a) azo metal complex dye contained in the recording layer is an azo metal complex dye expressed by General Formula (1).

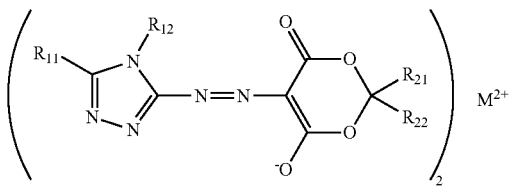

(1)

In General Formula (1), $R_{11}$ and $R_{12}$ are each an independent functional group selected from the group that includes a hydrogen atom; alkyl group with 4 or less carbon atoms; alkyl group with 4 or less carbon atoms being substituted by an aryl group with 6 to 10 carbon atoms; dialkyl amino group having identical or different alkyl groups with 4 or less carbon atoms; halogen group; perfluoroalkyl group with 4 or less carbon atoms; alkoxy group with 4 or less carbon atoms; alkylthio group with 4 or less carbon atoms; and N,N-dialkyl carbamoyl group having identical or different alkyl groups with 4 or less carbon atoms.

The alkyl group with 4 or less carbon atoms may be straight-chain or branched-chain alkyl or have a ring structure. Examples of the alkyl group with 4 or less carbon atoms include methyl group, ethyl group, n-propyl group, isopropyl group, n-butyl group, isobutyl group, sec-butyl group and t-butyl group, among others.

Examples of the alkyl group with 4 or less carbon atoms being substituted by an aryl group with 6 to 10 carbon atoms include benzyl group, phenylethyl group and 1-naphthyl methyl group, among others. The alkyl group may be straight-chain or branched-chain alkyl or have a ring structure.

The dialkyl amino group having identical or different alkyl groups with 4 or less carbon atoms may include dimethyl amino group and diethyl amino group, among others. The alkyl group may be straight-chain or branched-chain alkyl or have a ring structure.

Examples of the halogen group include fluorine, chlorine and bromine, among others.

Examples of the perfluoroalkyl group with 4 or less carbon atoms include trifluoromethyl group and pentafluoroethyl group, among others. The alkyl group may be straight-chain or branched-chain alkyl or have a ring structure.

The alkoxy group with 4 or less carbon atoms may be straight-chain or branched-chain alkoxy or have a ring structure. Examples of the alkoxy group with 4 or less carbon atoms include methoxy group and ethoxy group, among others.

Examples of the alkylthio group with 4 or less carbon atoms include methylthio group and ethyl thio group, among others. The alkyl group may be straight-chain or branched-chain alkyl or have a ring structure.

Examples of the N,N-dialkyl carbamoyl group having identical or different alkyl groups with 4 or less carbon atoms include N,N-dimethyl carbamoyl group and N,N-diethyl carbamoyl group, among others. The alkyl group may be straight-chain or branched-chain alkyl or have a ring structure.

In General Formula (1), $R_{21}$ and $R_{22}$ are each an independent alkyl group with 5 or less carbon atoms, or alternatively $R_{21}$ and $R_{22}$ can together form a 3 to 10-member ring.

Examples of the alkyl group with 5 or less carbon atoms include methyl group, ethyl group, n-propyl group, isopropyl group, n-butyl group, isobutyl group, sec-butyl group and t-butyl group, among others. Examples of the ring formed by $R_{21}$ and $R_{22}$ together include cyclic alkyl group with 3 to 10 carbon atoms, among others. Such cyclic group can have an alkyl group, carboxylic acid ethyl group or other substitution group with 3 or less carbon atoms. Examples of the cyclic alkyl group with 3 to 10 carbon atoms include cyclohexyl group and adamantyl group, among others.

In General Formula (1), M represents a metal atom selected from the group that includes nickel, cobalt and copper, and preferably nickel.

Specific examples of the chemical compound expressed by General Formula (1) include the chemical compounds shown below.

TABLE 1

Molecular structure

Chemical Formula 11

TABLE 1-continued
| Molecular structure | |
|---|---|
| 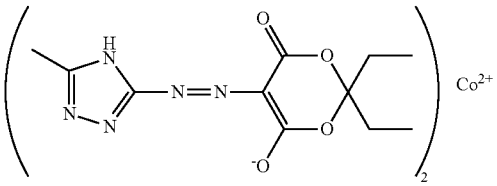 | Chemical Formula 12 |
| 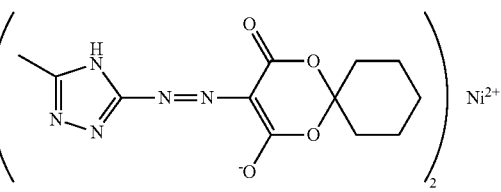 | Chemical Formula 13 |
| 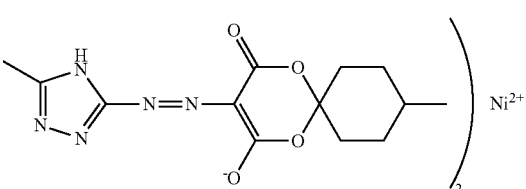 | Chemical Formula 14 |
| 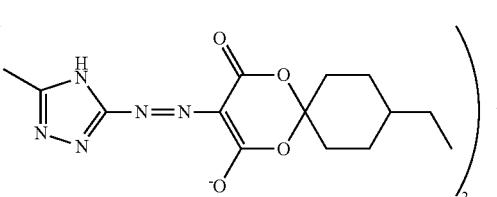 | Chemical Formula 15 |
| 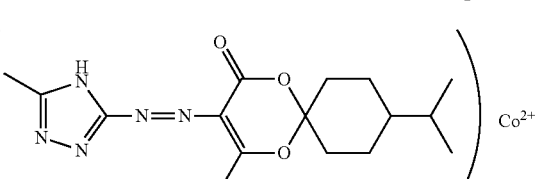 | Chemical Formula 16 |
| 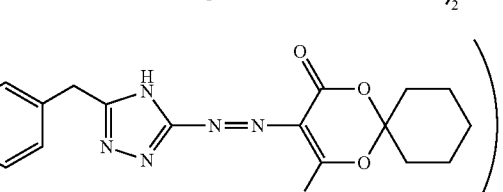 | Chemical Formula 17 |
| 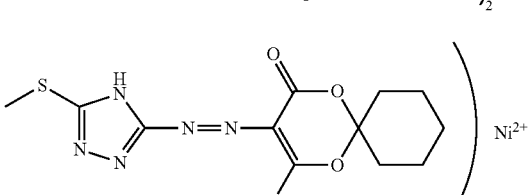 | Chemical Formula 18 |
| 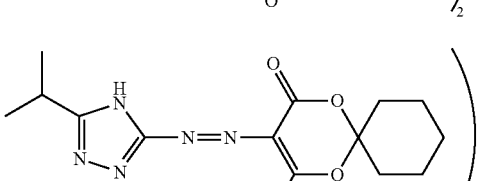 | Chemical Formula 19 |

TABLE 1-continued

Molecular structure

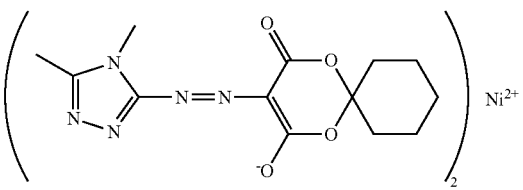

Chemical Formula 20

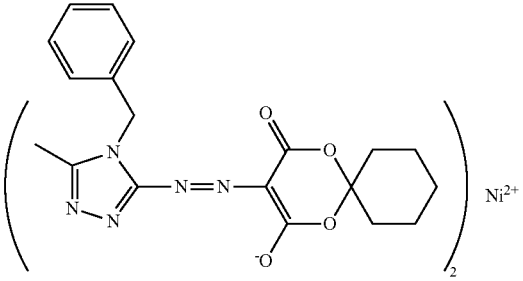

Chemical Formula 21

Ionic organic compound (b) in the recording layer contains a heteroaromatic quaternary ammonium ion. Examples of the heteroaromatic quaternary ammonium ion include a quaternary ammonium ion produced by quaternarizing nitrogen in a nitrogen-containing heteroaromatic ring compound using an alkyl group or aryl group.

Here, preferably the alkyl group with which to quaternarize nitrogen is an alkyl group with 10 or less carbon atoms, such as methyl group, ethyl group, n-propyl group, isopropyl group, n-butyl group, isobutyl group, sec-butyl group and t-butyl group, for example. The alkyl group may be straight-chain or branched-chain alkyl, or have a ring structure or substitution group. It can also have an aromatic group, etc., at the end.

Preferably the aryl group with which to quaternarize nitrogen is an aryl group with 6 to 10 carbon atoms, such as phenyl group and 1-naphthyl group, for example. The aryl group may have a substitution group.

Ionic organic compound (b) also contains an anion that is a counterion for the heteroaromatic quaternary ammonium ion. No limitation is imposed on such an anion.

The content of ionic organic compound (b) in the recording layer is preferably 10 to 35 percent by weight, or more preferably 15 to 30 percent by weight, relative to the weight of all organic dye including ionic organic compound (b) in the recording layer.

For the material with which to form the light transmission layer, acrylic and other UV-hardening resins can be used, for example. Preferably the light transmission layer has a one-layer configuration. In addition, preferably the elastic modulus of the hardened light transmission layer at 25° C. is 40 MPa or more, but no more than 10000 MPa. The thickness of the light transmission layer is preferably 90 to 110 μm, or more preferably 95 to 105 μm. The light transmission rate of the light transmission layer, with respect to light of 405 nm in wavelength as measured by a spectrophotometer using light of 405 nm in wavelength, is preferably 70% or more, or more preferably 80% or more.

Preferably the recordable optical recording medium proposed by the present invention has a protection layer formed with dielectric material, between the recording layer and light transmission layer. When the light transmission layer is formed, the protection layer prevents the organic dye in the recording layer from diffusing to the light transmission layer, and also prevents mixing—a phenomenon of permeation into the recording layer of the solvent for photo-curing resin used when the light transmission layer is formed. The material with which to form the protection layer is not limited in any way, as long as it is a transparent dielectric material, where examples include silicon oxide (silicon dioxide is particularly preferred), zinc oxide, cerium oxide, yttrium oxide, indium oxide-tin oxide (ITO), and other oxides; zinc sulfide, yttrium sulfide, and other sulfides; silicon nitride and other nitrides; silicon carbide; and mixture of oxide and sulfur compound, among others. The protection layer is formed by sputtering, etc. The thickness of the protection layer is preferably 10 to 30 nm, or more preferably 15 to 20 nm.

Preferably the recordable optical recording medium proposed by the present invention may have a hardcoat layer formed on the surface on the side opposite the one where the protection layer is formed. The hardcoat layer physically protects the light transmission layer and prevents the light transmission layer from being scratched. The material with which to form the hardcoat layer is not limited in any way, but materials offering excellent transparency and wear resistance are preferred. The hardcoat layer is formed by spin-coating a resin composition constituted by UV-hardening resin with inorganic grains added to it. The thickness of the hardcoat layer is preferably 1 to 5 μm, or more preferably 2 to 4 μm.

A recordable optical recording medium of LTH (Low to High) recording type, pertaining to a favorable embodiment of the present invention, is explained using the schematic longitudinal cross-section view in FIG. 1. The recordable optical recording medium 1 has a substrate 10; a reflection layer 11, recording layer 12, protection layer 13, light transmission layer 14 of one-layer configuration having optical transparency, and hardcoat layer 15 are layered in this order on the substrate 10. The configuration is such that the recording laser beam 5 for recording data in the recording layer 12 of the optical recording medium 1, and playback laser beam 5 for playing back the data recorded in the recording layer 12, are irradiated onto the optical recording medium 1 through the surface of the hardcoat layer 15. Although not shown in FIG. 1, the recordable optical recording medium 1 has a circular-disk shape and a center hole is formed at its center. Spiral guide grooves 10a are formed on the surface of the substrate 10. The spiral guide grooves 10*a* can be formed by, for example, injection-molding the substrate 10 using dies in which a stamper is set. The guide grooves 10*a* are formed at a pitch of 0.35 μm or 0.32 μm.

A reflection layer 11 is formed by means of sputtering, etc., on the surface of the substrate 10 on the side where the spiral guide grooves 10*a* are formed. A recording layer 12 is formed on the surface of the reflection layer 11. The recording layer 12 is formed by spin-coating the surface of the reflection layer 11 with an organic substance solution containing organic dye and then drying the solution. A protection layer 13 is formed on the surface of the recording layer 12. A light transmission layer 14 of one-layer configuration is formed on the surface of the protection layer 13. The light transmission layer 14 can be formed by, for example, spin-coating the surface of the protection layer 13 with a photo-curing resin solution that hardens when UV light or radiation is irradiated, and then irradiating UV light or radiation onto and thereby hardening the coating film thus formed. A hardcoat layer 15 that physically protects the light transmission layer 14 and prevents the light transmission layer 14 from being scratched, is formed on the surface of the light transmission layer 14.

To record data to the optical recording medium 1 having such a configuration, a laser beam 5 having a wavelength of 300 nm to 500 nm, particularly around 400 nm (such as 405 nm), is irradiated from the hardcoat layer 15 side. The laser beam 5 transmits through the hardcoat layer 15, light transmission layer 14 of one-layer configuration, and protection layer 13, and enters the recording layer 12. Or, it transmits through the recording layer 12, reflects on the reflection layer 11, and enters the recording layer 12. This decomposes the organic dye contained in the area of the recording layer 12 irradiated by the laser beam 5, and as the reflectance of this area rises, a recording pit is formed and data is written to the optical recording medium 1.

EXAMPLES

Examples of Ionic Organic Compounds

Cations, or specifically heteroaromatic quaternary ammonium ions, and anions in ionic organic compound (b) are shown in Tables 2 and 3 below.

TABLE 2

| Molecular structure | |
|---|---|
| 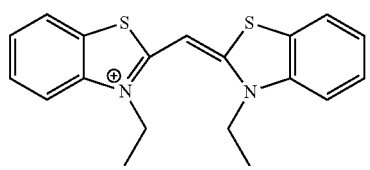 [SMILES: CCN1/C(=C\c2sc3ccccc3[n+]2CC)Sc2ccccc21] | C1 |
| 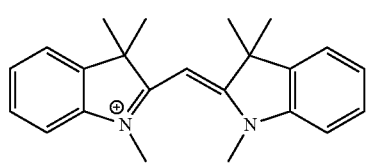 [SMILES: CN1/C(=C\C2=[N+](C)c3ccccc3C2(C)C)C(C)(C)c2ccccc21] | C2 |

TABLE 2-continued

| Molecular structure | |
|---|---|
| 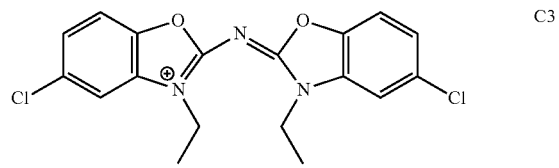 | C3 |
| 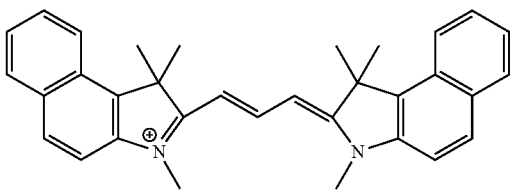 [SMILES: CN1/C(=C\C=C\C2=[N+](C)c3ccc4ccccc4c3C2(C)C)C(C)(C)c2c1ccc1ccccc21] | C4 |
| 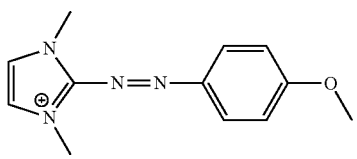 [SMILES: COc1ccc(N=Nc2n(C)cc[n+]2C)cc1] | C5 |
| 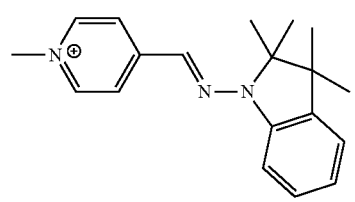 | C6 |
| 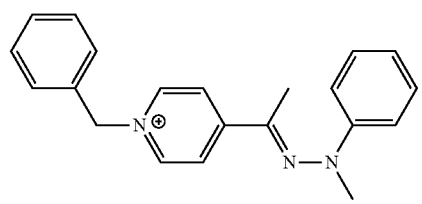 [SMILES: C/C(=N\N(C)c1ccccc1)c1cc[n+](Cc2ccccc2)cc1] | C7 |
| 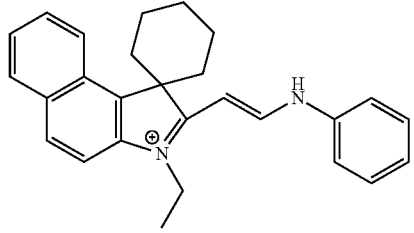 [SMILES: CC[N+]1=C(/C=C/Nc2ccccc2)C2(CCCCC2)c2c1ccc1ccccc21] | C8 |
| 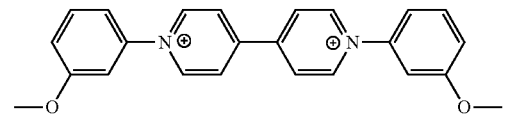 | C9 |
| 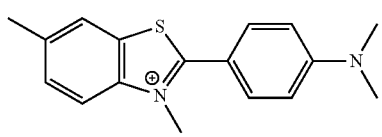 | C10 |
| 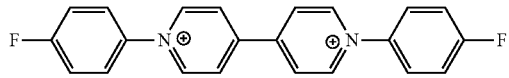 [SMILES: Fc1ccc(-[n+]2ccc(-c3cc[n+](-c4ccc(F)cc4)cc3)cc2)cc1] | C11 |

TABLE 2-continued

Molecular structure

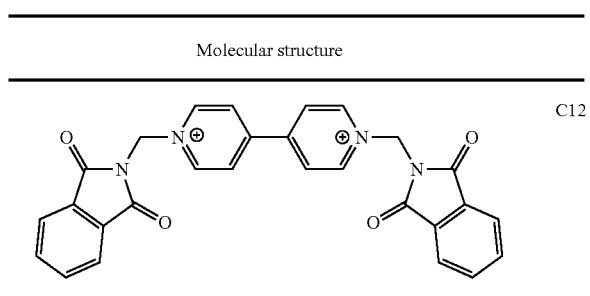
C12

TABLE 3

Molecular structure

| | |
|---|---|
| I⁻ | A1 |
| PF₆⁻ | A2 |

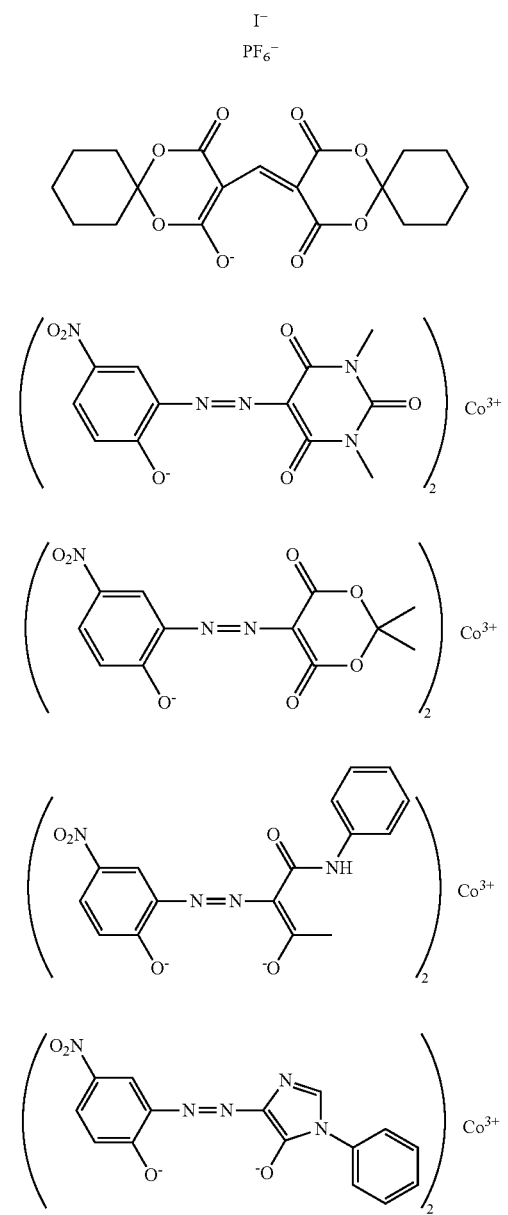

A3

A4

A5

A6

A7

TABLE 3-continued

Molecular structure

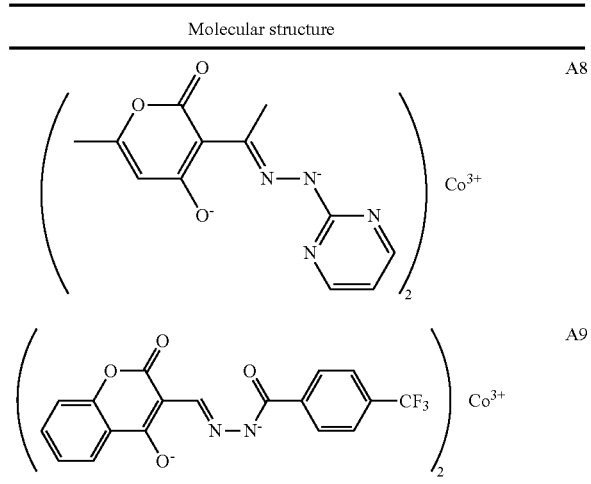

A8

A9

Example 1

A disk-shaped polycarbonate resin substrate of 120 mm in outer diameter and 1.1 mm in thickness, having spiral guide grooves formed on the surface at a pitch of 0.32 μm, was made by injection molding. A reflection layer constituted by Ag alloy (In ratio: 0.2 percent by weight) was formed on the surface of the substrate on the side where the guide grooves were formed, to a thickness of 60 nm, by means of sputtering. On the surface of the reflection layer, tracks of 35 nm in depth and 140 nm in width, corresponding to the guide grooves, were formed.

Next, 80 percent by weight of azo metal complex dye (main dye: Chemical Formula 11) and 20 percent by weight of ionic organic compound (cation: C1, anion: A1) were mixed and the mixture was dissolved in 2,2,3,3-tetrafluoro-1-propanol (TFP), to prepare an organic dye solution. The obtained organic dye solution was spin-coated onto the surface of the reflection layer to form a coating film, after which the coating film was dried at a temperature of 80° C. for 10 minutes to form a recording layer whose optical density (OD value) would become 0.24 at the maximum absorption wavelength (λmax=370 nm). The OD value indicates the optical density of the recording layer formed directly on the substrate, without forming the reflection layer, based on the OD value of the substrate alone being 0.

Furthermore, a protection layer constituted by indium oxide-tin oxide (ITO) was formed on the surface of the recording layer, to a thickness of 20 nm, by means of sputtering.

Next, acrylic UV-hardening resin was spin-coated onto the surface of the protection layer to form a coating film, after which UV light was irradiated to harden the coating film to form a light transmission layer of one-layer configuration having a thickness of 97 μm. The elastic modulus of the hardened light transmission layer at 25° C. was 620 MPa. Elastic modulus was measured using the dynamic visco-elasticity measuring apparatus "RMAIII" (brand name) manufactured by TA Instruments. The sample resin was coated onto a disc to 100 μm and hardened, after which the resin was separated from the disc and cut to a size of 5 mm×50 mm to obtain a test piece.

Furthermore, a resin composition constituted by UV-hardening resin with fine inorganic grains added to it, was spin-coated onto the surface of the light transmission layer to form a coating film. UV light was then irradiated onto the coating film to harden the coating film, to form a hardcoat layer of 3 μm in thickness. A sample optical recording medium was thus prepared.

Next, the obtained sample optical recording medium was set in the data recording/playback apparatus "ODU-1000" (brand name) manufactured by Pulstec in an environment of 55° C. While turning the disc at a line speed of 19.67 msec (quad-speed recording), a laser beam of 405 nm in wavelength was irradiated onto the recording layer through the light transmission layer using an objective lens with an NA of 0.85, while changing the power of the laser beam, to record data. The data thus recorded in the sample optical recording medium was played back using the aforementioned data recording/playback apparatus and when the playback characteristics were evaluated, the optimal recording power (optimal Pw) of playback signals was 8.3 mW. The optimal Pw represents the laser power at the minimum R-SER of $7.2 \times 10^{-4}$.

Next, this sample optical recording medium was left for 100 hours in a high-temperature, high-humidity environment of 80° C., 80%, and then the recorded data was played back at the optimal recording power, where the evaluation found that the R-SER was $6.4 \times 10^{-3}$, no more than 10 times the R-SER before the sample was exposed to the high-temperature, high-humidity environment, which indicates that the good characteristic was maintained.

Examples 2 to 34 and Comparative Examples 1 to 13

Sample optical recording media were prepared in the same manner as in Example 1, except that the types of main dye and cations and anions in ionic organic compound, and mixing ratios, were changed as shown in Tables 4 and 5. The evaluation results are shown in Tables 4 and 5. The good recording characteristics under Examples 2 to 34 were maintained, because the difference between the minimum R-SER value during quad-speed recording and the R-SER value measured after 100 hours of exposure to the high-temperature, high-humidity environment of 80° C., 80% was no more than 10 times. On the other hand, good recording characteristics could not be maintained under Comparative Examples 1 to 13, because the difference between the minimum R-SER value during quad-speed recording and the R-SER value measured after 100 hours of exposure to the high-temperature, high-humidity environment of 80° C., 80% was more than 10 times.

TABLE 4

| | Main dye | Cation | Anion | Additive ratio [percent by weight] | Optimal Pw [mW] | Initial R-SER | R-SER after high-temperature, high-humidity test |
|---|---|---|---|---|---|---|---|
| Example 1 | Chemical Formula 11 | C1 | A1 | 20 | 8.3 | $7.2 \times 10^{-4}$ | $6.4 \times 10^{-3}$ |
| Example 2 | Chemical Formula 11 | C2 | A2 | 20 | 8.5 | $6.6 \times 10^{-4}$ | $3.4 \times 10^{-3}$ |
| Example 3 | Chemical Formula 11 | C3 | A2 | 20 | 9.0 | $6.2 \times 10^{-4}$ | $2.7 \times 10^{-3}$ |
| Example 4 | Chemical Formula 11 | C4 | A1 | 20 | 8.6 | $7.3 \times 10^{-4}$ | $4.5 \times 10^{-3}$ |
| Example 5 | Chemical Formula 11 | C5 | A4 | 20 | 8.7 | $8.0 \times 10^{-4}$ | $6.9 \times 10^{-3}$ |
| Example 6 | Chemical Formula 11 | C6 | A2 | 20 | 8.7 | $7.8 \times 10^{-4}$ | $6.1 \times 10^{-3}$ |
| Example 7 | Chemical Formula 11 | C7 | A2 | 20 | 8.8 | $8.2 \times 10^{-4}$ | $7.8 \times 10^{-3}$ |
| Example 8 | Chemical Formula 11 | C8 | A4 | 20 | 8.8 | $7.5 \times 10^{-4}$ | $6.6 \times 10^{-3}$ |
| Example 9 | Chemical Formula 11 | C9 | A3 | 20 | 8.7 | $6.7 \times 10^{-4}$ | $5.5 \times 10^{-3}$ |
| Example 10 | Chemical Formula 11 | C3 | A4 | 20 | 8.4 | $9.7 \times 10^{-4}$ | $7.5 \times 10^{-3}$ |
| Example 11 | Chemical Formula 11 | C2 | A2 | 10 | 8.5 | $6.5 \times 10^{-4}$ | $5.2 \times 10^{-3}$ |
| Example 12 | Chemical Formula 11 | C2 | A2 | 30 | 8.2 | $8.4 \times 10^{-4}$ | $7.2 \times 10^{-3}$ |
| Example 13 | Chemical Formula 12 | C2 | A2 | 20 | 8.8 | $6.4 \times 10^{-4}$ | $4.4 \times 10^{-3}$ |
| Example 14 | Chemical Formula 13 | C2 | A2 | 20 | 8.6 | $6.2 \times 10^{-4}$ | $5.3 \times 10^{-3}$ |
| Example 15 | Chemical Formula 14 | C2 | A2 | 20 | 8.9 | $7.6 \times 10^{-4}$ | $2.4 \times 10^{-3}$ |
| Example 16 | Chemical Formula 15 | C2 | A2 | 20 | 8.7 | $8.5 \times 10^{-4}$ | $4.9 \times 10^{-3}$ |
| Example 17 | Chemical Formula 16 | C2 | A2 | 20 | 8.6 | $7.5 \times 10^{-4}$ | $5.4 \times 10^{-3}$ |
| Example 18 | Chemical Formula 17 | C2 | A2 | 20 | 8.4 | $7.6 \times 10^{-4}$ | $6.7 \times 10^{-3}$ |
| Example 19 | Chemical Formula 18 | C2 | A2 | 20 | 8.2 | $5.6 \times 10^{-4}$ | $3.8 \times 10^{-3}$ |
| Example 20 | Chemical Formula 19 | C2 | A2 | 20 | 8.3 | $6.9 \times 10^{-4}$ | $3.4 \times 10^{-3}$ |
| Example 21 | Chemical Formula 20 | C2 | A2 | 20 | 8.2 | $7.2 \times 10^{-4}$ | $6.2 \times 10^{-3}$ |
| Example 22 | Chemical Formula 21 | C2 | A2 | 20 | 8.3 | $8.5 \times 10^{-4}$ | $7.4 \times 10^{-3}$ |
| Example 23 | Chemical Formula 13 | C4 | A1 | 20 | 8.8 | $7.8 \times 10^{-4}$ | $6.5 \times 10^{-3}$ |
| Example 24 | Chemical Formula 15 | C4 | A1 | 20 | 8.4 | $7.2 \times 10^{-4}$ | $5.7 \times 10^{-3}$ |
| Example 25 | Chemical Formula 17 | C4 | A1 | 20 | 8.6 | $8.1 \times 10^{-4}$ | $7.4 \times 10^{-3}$ |
| Example 26 | Chemical Formula 18 | C3 | A4 | 20 | 8.3 | $1.1 \times 10^{-3}$ | $1.0 \times 10^{-2}$ |
| Example 27 | Chemical Formula 19 | C3 | A4 | 20 | 8.4 | $9.8 \times 10^{-4}$ | $9.7 \times 10^{-3}$ |
| Example 28 | Chemical Formula 20 | C3 | A4 | 20 | 8.1 | $9.5 \times 10^{-4}$ | $9.3 \times 10^{-3}$ |
| Example 29 | Chemical Formula 21 | C3 | A4 | 20 | 8.2 | $8.2 \times 10^{-4}$ | $7.3 \times 10^{-3}$ |
| Example 30 | Chemical Formula 13 | C1 | A6 | 20 | 8.5 | $9.1 \times 10^{-4}$ | $8.6 \times 10^{-3}$ |
| Example 31 | Chemical Formula 13 | C2 | A7 | 20 | 8.2 | $7.1 \times 10^{-4}$ | $6.6 \times 10^{-3}$ |
| Example 32 | Chemical Formula 15 | C10 | A5 | 20 | 8.6 | $8.5 \times 10^{-4}$ | $6.3 \times 10^{-3}$ |
| Example 33 | Chemical Formula 15 | C11 | A5 | 20 | 8.7 | $9.2 \times 10^{-4}$ | $7.3 \times 10^{-3}$ |
| Example 34 | Chemical Formula 18 | C12 | A2 | 20 | 8.4 | $8.6 \times 10^{-4}$ | $6.4 \times 10^{-3}$ |

TABLE 5

| | Main dye | Cation | Anion | Additive ratio [percent by weight] | Optimal Pw [mW] | Initial R-SER | R-SER after high-temperature, high-humidity test |
|---|---|---|---|---|---|---|---|
| Comparative Example 1 | Chemical Formula 11 | — | — | — | 8.6 | $8.8 \times 10^{-4}$ | $3.2 \times 10^{-2}$ |

TABLE 5-continued

| | Main dye | Cation | Anion | Additive ratio [percent by weight] | Optimal Pw [mW] | Initial R-SER | R-SER after high-temperature, high-humidity test |
|---|---|---|---|---|---|---|---|
| Comparative Example 2 | Chemical Formula 12 | — | — | — | 9.1 | $9.2 \times 10^{-4}$ | $1.8 \times 10^{-2}$ |
| Comparative Example 3 | Chemical Formula 13 | — | — | — | 8.7 | $7.2 \times 10^{-4}$ | $8.2 \times 10^{-2}$ |
| Comparative Example 4 | Chemical Formula 14 | — | — | — | 8.8 | $6.8 \times 10^{-4}$ | $9.4 \times 10^{-3}$ |
| Comparative Example 5 | Chemical Formula 15 | — | — | — | 8.8 | $9.0 \times 10^{-4}$ | $1.2 \times 10^{-2}$ |
| Comparative Example 6 | Chemical Formula 16 | — | — | — | 8.6 | $7.6 \times 10^{-4}$ | $9.1 \times 10^{-3}$ |
| Comparative Example 7 | Chemical Formula 17 | — | — | — | 8.6 | $9.1 \times 10^{-4}$ | $2.6 \times 10^{-2}$ |
| Comparative Example 8 | Chemical Formula 18 | — | — | — | 8.4 | $9.8 \times 10^{-4}$ | $1.5 \times 10^{-2}$ |
| Comparative Example 9 | Chemical Formula 19 | — | — | — | 8.6 | $8.8 \times 10^{-4}$ | $9.8 \times 10^{-3}$ |
| Comparative Example 10 | Chemical Formula 20 | — | — | — | 8.7 | $9.2 \times 10^{-4}$ | $9.7 \times 10^{-3}$ |
| Comparative Example 11 | Chemical Formula 21 | — | — | — | 8.8 | $8.2 \times 10^{-4}$ | $3.8 \times 10^{-2}$ |
| Comparative Example 12 | Chemical Formula 11 | C2 | A2 | 5 | 8.5 | $3.5 \times 10^{-4}$ | $5.2 \times 10^{-3}$ |
| Comparative Example 13 | Chemical Formula 11 | C2 | A2 | 40 | 10.6 | $5.4 \times 10^{-3}$ | $9.2 \times 10^{-2}$ |

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-012360, filed Jan. 24, 2012, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An optical recording medium comprising a substrate as well as at least a reflection layer, recording layer, and light transmission layer provided on the substrate, wherein a dye included in the recording layer of said optical recording medium contains (a) an azo metal complex dye and (b) an ionic organic compound containing a heteroaromatic quaternary ammonium ion, wherein the heteroaromatic quaternary ammonium ion in the ionic organic compound (b) is a quaternary ammonium ion produced by quaternarizing nitrogen in a nitrogen-containing heteroaromatic ring compound using an alkyl group or aryl group.

2. An optical recording medium according to claim 1, wherein dye (a) is an azo metal complex dye expressed by General Formula (1)

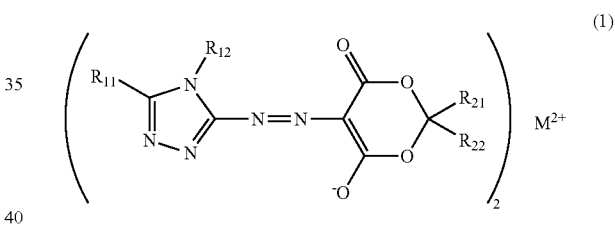

wherein $R_{11}$ and $R_{12}$ are each an independent functional group selected from the group consisting of hydrogen atom; alkyl group with 4 or less carbon atoms; alkyl group with 4 or less carbon atoms being substituted by an aryl group with 6 to 10 carbon atoms; dialkyl amino group having identical or different alkyl groups with 4 or less carbon atoms; halogen group; perfluoroalkyl group with 4 or less carbon atoms; alkoxy group with 4 or less carbon atoms; alkylthio group with 4 or less carbon atoms; and N,N-dialkyl carbamoyl group having identical or different alkyl groups with 4 or less carbon atoms; $R_{21}$ and $R_{22}$ are each an independent alkyl group with 5 or less carbon atoms, or alternatively $R_{21}$ and $R_{22}$ can together form a 3 to 10-member ring; M represents a metal atom selected from the group consisting of nickel, cobalt and copper.

3. An optical recording medium according to claim 2, wherein the content of the ionic organic compound (b) in the recording layer is 10 to 35 percent by weight relative to the weight of all organic dye in the recording layer.

4. An optical recording medium according to claim 1, wherein the content of the ionic organic compound (b) in the recording layer is 10 to 35 percent by weight relative to the weight of all organic dye in the recording layer.

5. An optical recording medium according to claim 2, wherein the light transmission layer has a one-layer configuration.

6. An optical recording medium according to claim 1, wherein the light transmission layer has a one-layer configuration.

7. An optical recording medium according to claim 5, wherein the elastic modulus of the light transmission layer at 25° C. is 40 MPa or more, but no more than 10000 MPa.

8. An optical recording medium according to claim 6, wherein the elastic modulus of the light transmission layer at 25° C. is 40 MPa or more, but no more than 10000 MPa.

9. An optical recording medium according to claim 2, wherein a protection layer formed with dielectric material is provided between the recording layer and light transmission layer.

10. An optical recording medium according to claim 1, wherein a protection layer formed with dielectric material is provided between the recording layer and light transmission layer.

11. An optical recording medium according to claim 9, wherein a hardcoat layer is formed on the surface of the light transmission layer on the side opposite the one where the protection layer is formed.

12. An optical recording medium according to claim 10, wherein a hardcoat layer is formed on the surface of the light transmission layer on the side opposite the one where the protection layer is formed.

* * * * *